United States Patent [19]
Hitomi et al.

[11] Patent Number: 4,813,232
[45] Date of Patent: Mar. 21, 1989

[54] EXHAUST DEVICE FOR INTERNAL COMBUSTION ENGINE

[75] Inventors: Mitsuo Hitomi, Hiroshima; Fumio Hinatase; Kazuaki Umezono, both of Aki, all of Japan

[73] Assignee: Mazda Motor Corporation, Hiroshima, Japan

[21] Appl. No.: 55,333

[22] Filed: May 28, 1987

[30] Foreign Application Priority Data

May 30, 1986 [JP] Japan .................. 61-123742

[51] Int. Cl.$^4$ .................. F02B 27/02; F01N 7/10
[52] U.S. Cl. .................. 60/313; 60/280; 60/323; 60/602
[58] Field of Search .................. 60/313, 323, 280, 602, 60/605

[56] References Cited

FOREIGN PATENT DOCUMENTS

| 2852736 | 6/1980 | Fed. Rep. of Germany ........ 60/313 |
| 1140745 | 8/1957 | France . |
| 2122131 | 8/1972 | France . |
| 523 | 1/1984 | Japan ..................................... 60/313 |
| 68520 | 4/1984 | Japan ..................................... 60/313 |
| 59-148427 | 4/1984 | Japan . |
| 955056 | 4/1964 | United Kingdom . |

Primary Examiner—Douglas Hart
Attorney, Agent, or Firm—Wenderoth, Lind & Ponack

[57] ABSTRACT

An exhaust device for use in an internal combustion engine includes a plurality of independent passages each connected to an exhaust port of a respective cylinder of the engine. At least one communicating passage is provided to connect the independent passages to each other at points upstream of a junction where the independent passages are joined together. The communicating passage permits the exhaust gases from one cylinder to flow into the independent passages for the other cylinders, thus lowering the gas temperature and improving fuel comsumption.

29 Claims, 15 Drawing Sheets

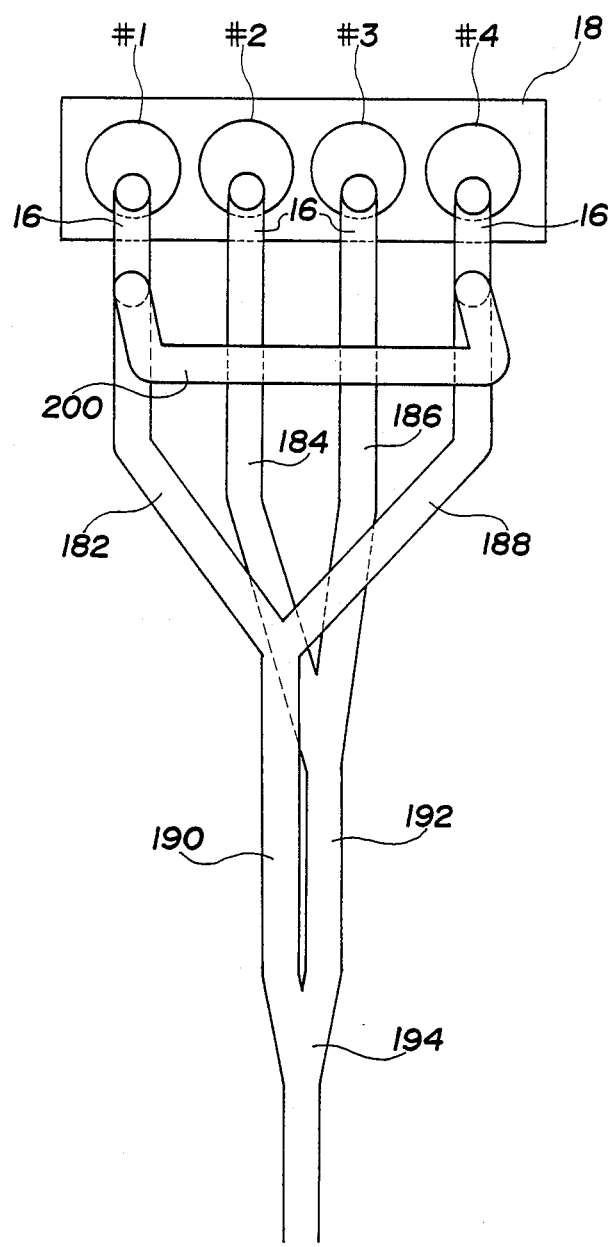

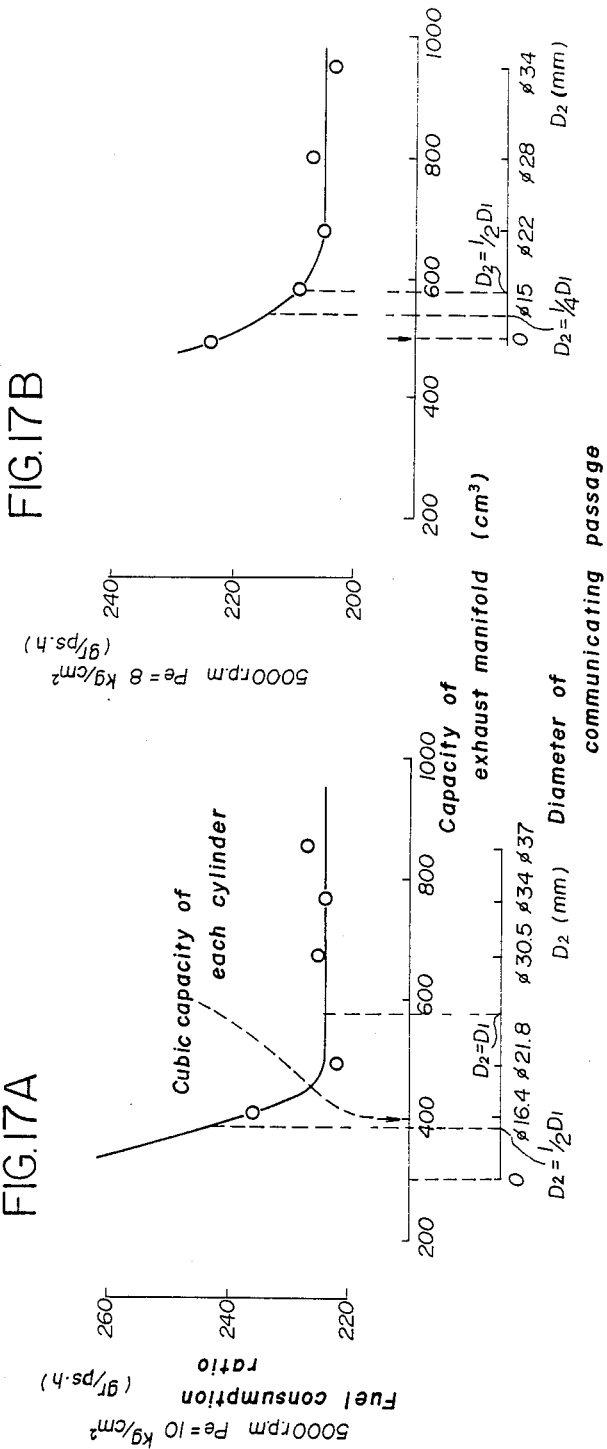

EXHAUST DEVICE FOR INTERNAL COMBUSTION ENGINE

BACKGROUND OF THE INVENTION

1. Field of the Invention

The present invention relates to an exhaust device for use in an internal combustion engine and, more particularly, to an exhaust device for a multiple cylinder engine in which an independent exhaust passage is provided for each cylinder.

2. Description of the Prior Art

There is well known a turbocharger which is operated by exhaust gases from an engine, and which is a kind of supercharger for increasing the intake pressure to thereby increase the volume of the suction air to be charged into a cylinder of the engine. The turbocharger has in the exhaust passage an exhaust gas turbine which is rotated by the exhaust gases to drive a pump for compressing the air.

In an engine provided with the turbocharger, to improve the charging response during lower speed driving of the engine the independent exhaust passages for respective cylinders should be somewhat of small diameter to decrease the volume of portions thereof upstream of the turbine, which however results in high temperature and high pressure of the exhaust gases during high-speed, high-loaded conditions of the engines. When these high-temperature, high-pressure gases are directly supplied to the exhaust gas turbine, a large thermal load is imposed on the turbine.

On the other hand, also in an engine without a turbocharger, i.e. a natural aspiration engine, the exhaust gases become of high temperature and high pressure during the high-speed, high-loaded engine conditions so that there is the possibility that the exhaust manifold and an exhaust emission control device in the exhaust passage downstream of the manifold may be deteriorated prematurely. An attempt to solve this problem by enlarging the diameter of the exhaust passage would cause a disadvantageously large size of the exhaust device.

In view of this situation it has been considered necessary to set an air-fuel ratio richer than the theoretical air-fuel ratio, so that an excessive amount of fuel which is not burned in the cylinder consumes energy of the exhaust gases when vaporized, resulting in lowering the temperature of the exhaust gases. This solution, however, involves not only poor fuel consumption but also a decrease in torque due to the richer air-fuel ratio.

Japanese Utility Model Laid-Open (Kokai) No. 59-148427 discloses an exhaust manifold having a partition which divides an internal passage of the manifold in such a manner as to avoid interaction of the exhaust gases from cylinders and in which is provided a communication port adapted to open when the number of revolutions of the engine exceeds a predetermined value. This proposed structure might lower the temperature of the exhaust gases to some degree due to a decrease in gas pressure, but the extent of such lowering is still unsatisfactory.

Accordingly, an object of the present invention is to provide an exhaust device for an internal combustion engine which will lower the temperature and pressure of the exhaust gases during high-speed, high-loaded engine conditions without the necessity of setting the air-fuel ratio richer.

Another object of the invention is to provide an exhaust device which can improve fuel consumption without having reduced durability.

SUMMARY OF THE INVENTION

According to the present invention, an exhaust device for an internal combustion engine includes a plurality of independent passages each independently connected to an exhaust port of a respective cylinder, wherein at least one communicating passage is provided to communicate the independent passages with each other at points upstream of a junction where the independent passages are joined together.

In the exhaust device thus constituted, a part of the exhaust gases from one of the cylinders is discharged through the independent passage connected to that cylinder, while the other part of gases is discharged through the communicating passage and successively through the independent passages of the other cylinders. The communicating passage and the other independent passages provide a longer distance for flow of the exhaust gases and remarkably increase the radiating surface, whereby the temperature of the gases can be sufficiently lowered.

Further, since the exhaust gases from one cylinder are distributed between the independent passage of that cylinder and independent passages of the other cylinders via the communicating passage, the actual effective area for the flow of gases is increased to thereby reduce the passage resistance, which results in a reduction of the gas pressure and subsequent further lowering of the gas temperature.

Other objects, features and advantages of the present invention will become apparent from the following detailed description thereof when taken in conjuction with the accompanying drawings.

BRIEF DESCRIPTION OF THE DRAWINGS

FIGS. 15 and 16 are schematic plan views of the exhaust devices according to twelfth and thirteenth embodiments, resepectively, of the present invention;

FIGS. 17 A and B are diagrams each showing fuel consumption relative to diameter of a communicating passage.

DETAILED DESCRIPTION OF THE INVENTION

Figure 1A:
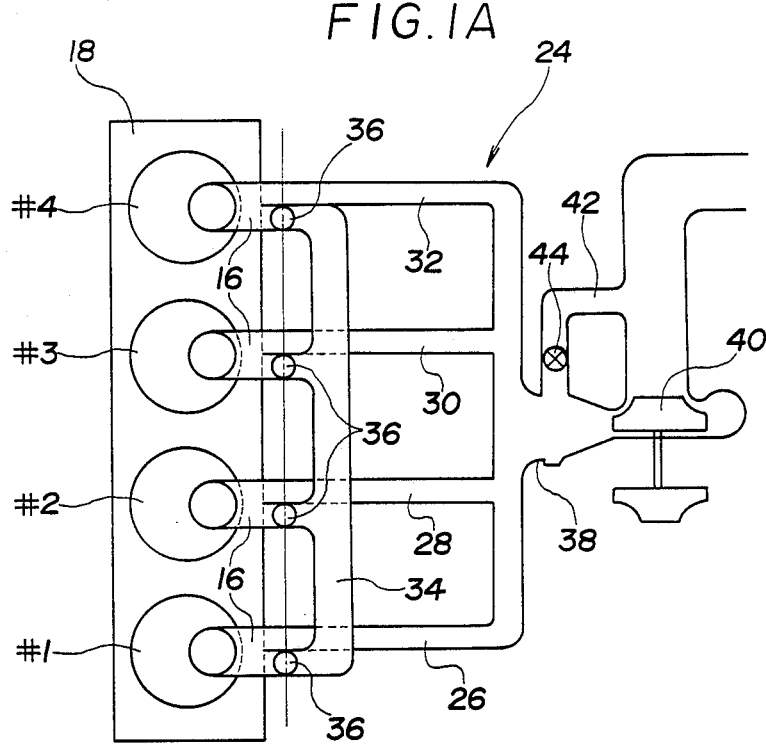
FIG. 1A is a schematic plan view showing an exhaust device for an engine according to a first embodiment of the present invention.
Figure 1B:
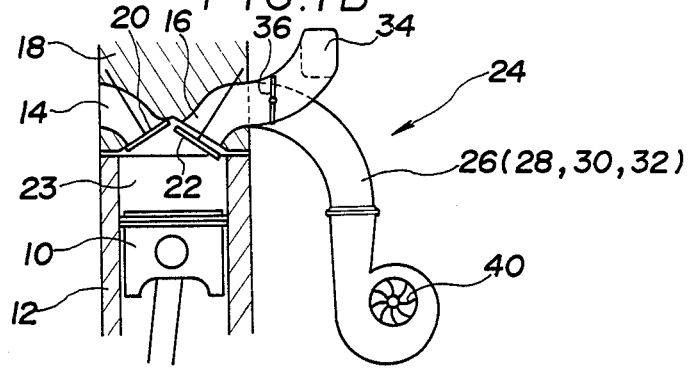
FIG. 1B is a sectional view showing a part of the device in FIG. 1A.

Referring first to FIGS. 1A and 1B of the drawings, there is illustrated an exhaust device of the invention applied to a four-cylinder (#1 through #4) engine having a turbocharger. Each cylinder includes a piston 10 mounted in a cylinder block 12 for defining a combustion chamber 23 in cooperation with a cylinder head 18. Formed in the cylinder head 18 are intake and exhaust ports 14 and 16 which are adapted to open to the combustion chamber 23 through intake and exhaust valves 20 and 22, respectively.

For discharging exhaust gases from the combustion chamber 23, each exhaust port 16 is connected to an exhaust passage 24 which, in the illustrated embodiment, comprises four independent passages 26, 28, 30 and 32 and a communicating passage 34. The independent passages are separately connected at first ends thereof to the exhaust ports 16 of the respective cylinders and are joined together at second ends so as to form a single passage 38 downstream of the junction. As clearly seen from the figures, the communicating passage 34 communicates the independent passages with each other at points upstream of the junction, that is, near the exhaust ports 16 in the illustrated embodiment.

Each independent passage of this embodiment is formed to have a diameter smaller than a diameter of the communicating passage 34. A rotary-type valve 36 is provided in each branch of the communicating passage 34 bifurcating from the independent passage, so that the respective communication may be controlled according to the engine conditions as described hereinafter. The rotational axes of the valves 36 are all aligned as seen from FIG. 1A.

Provided in the downstream single portion 38 of the exhaust passage 24 is a turbine 40 adapted to be rotationally driven by the exhaust gases, and a bypass 42 is formed to have the gases bypass the turbine 40 when so desired. The bypass 42 is opened or closed by a waste gate valve 44 disposed therein.

In the exhaust device constituted as above, the valves 36 are opened in the high-speed, high-loaded engine conditions. In this state, a part of the exhaust gases from one of the cylinders #1 through #4 is directly supplied to the turbine 40 through one of the independent passages 26, 28, 30 and 32 connected to the corresponding exhaust port 16 of the cylinder. At the same time, the other part of gases flows into the communicating passage 34 and then the other independent passages and is thereafter supplied to the turbine 40. For instance, when the exhaust gases are discharged from the exhaust port 16 of the cylinder #1, a part of the gases is supplied to the turbine 40 directly through the independent passage 26 for the cylinder #1, and the other part of the gases is supplied through the other independent passages 28, 30 and 32 for the cylinders #2 to #4 via the communicating passage 34. This increases the effective area for the flow of gases because the gases are discharged through the plural independent passages.

Therefore, the passage resistance against the flow of gases is reduced, which involves a decrease in the exhaust gas pressure and a consequent lowering of the gas temperature. As a result, it becomes substantially no longer necessary to provide a rich air-fuel mixture into the combustion chamber 23, which has hitherto been carried out in order to lower the temperature of exhaust gases as discussed above, so that the fuel consumption can be reduced in the high-speed, high-loaded engine conditions.

On the other hand, the valves 36 are closed or shut in the low-speed, low-loaded engine conditions. In that state, the exhaust gases from each of the cylinders #1 through #4 are led to the turbine 40 through only one of the independent exhaust passages 26, 28, 30 and 32 connected to the corresponding exhaust port 16. Thus, by forming each independent passage to have a desired small diameter, the exhaust gases are restrained from expanding and their flow velocity is maintained until they reach the turbine 40 for providing the energy thereto. Accordingly, high dynamic charging effect can be obtained, and the torque and accelerating response at low speeds can be improved.

In the above embodiment, boost can be controlled by the waste gate valve 44 in the bypass 42, and it is also possible to control the boost by gradually opening the valves 36 and by the waste gate valve 44 after the valves 36 are fully opened.

Figure 2A:
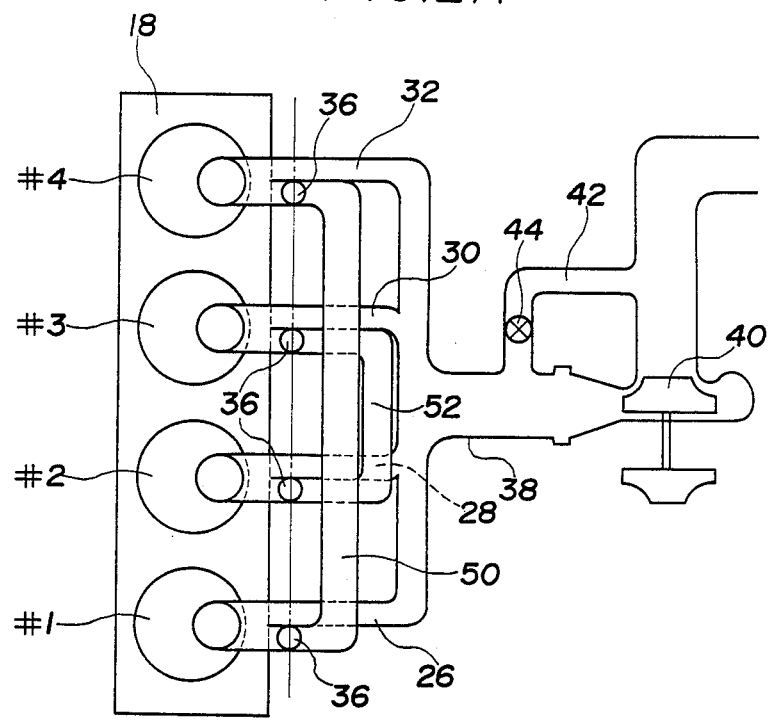
FIG. 2A is a schematic plan view of an exhaust device according to a second embodiment of the present invention.
Figure 2B:
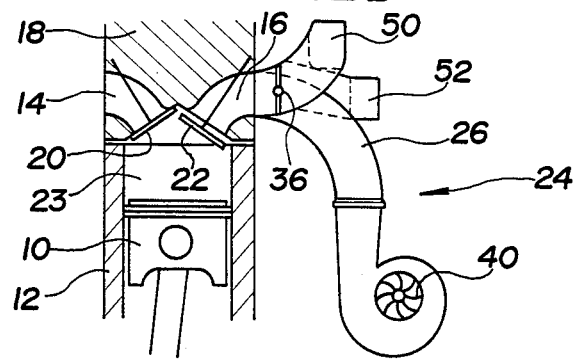
FIG. 2B is a sectional view showing a part of the device in FIG. 2A.

In a second embodiment of the present invention illustrated in FIGS. 2A and 2B, a communicating passage comprises a first passage 50 which communicates the two independent passages 26 and 32 for the respective cylinders #1 and #4 with each other, and a second passage 52 which communicates the other two independent passages 28 and 30 for the respective cylinders #2 and #3 with each other. This structure has an additional advantage that there is no interaction between the exhaust gases discharged from the cylinders #1 through #4.

It is to be noted here that when a communicating passage is divided into plural passages, each passage should communicate a group of independent passages in such a manner that each group exhausts alternately, to thereby prevent the interaction of exhaust gases. Thus, the application of the plural communicating passage structure is not limited to a four-cylinder engine.

Instead of the valves 36 provided in each branch of the communicating passages 50 and 52 in the second embodiment, a single valve may be provided in the intermediate portion of each communicating passage. In that case, the structure can be simplified.

Figure 3:
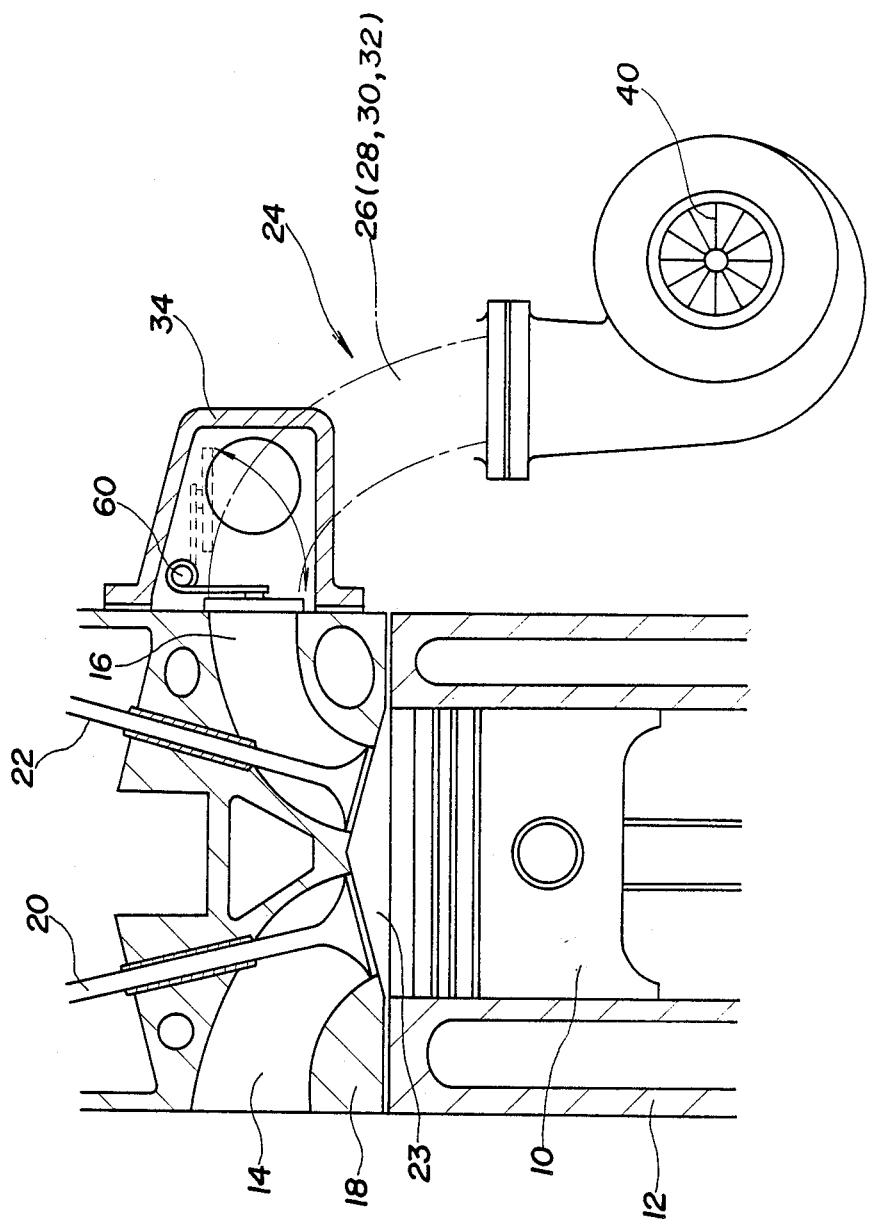
FIG. 3 is a sectional view showing a part of an exhaust device according to a third embodiment of the present invention.

An exhaust device illustrated in FIG. 3 is different from the device of FIG. 1 in that a swing-arm type valve 60 is provided instead of the rotary type valve 36, which valve 60 is adapted to open or close an opening of the exhaust port 16 for controlling the communication between the independent passage 26, 28, 30 or 32 and the communicating passage 34. The arm type valve 60 may be more reliable than the rotary type valve.

Figure 4:
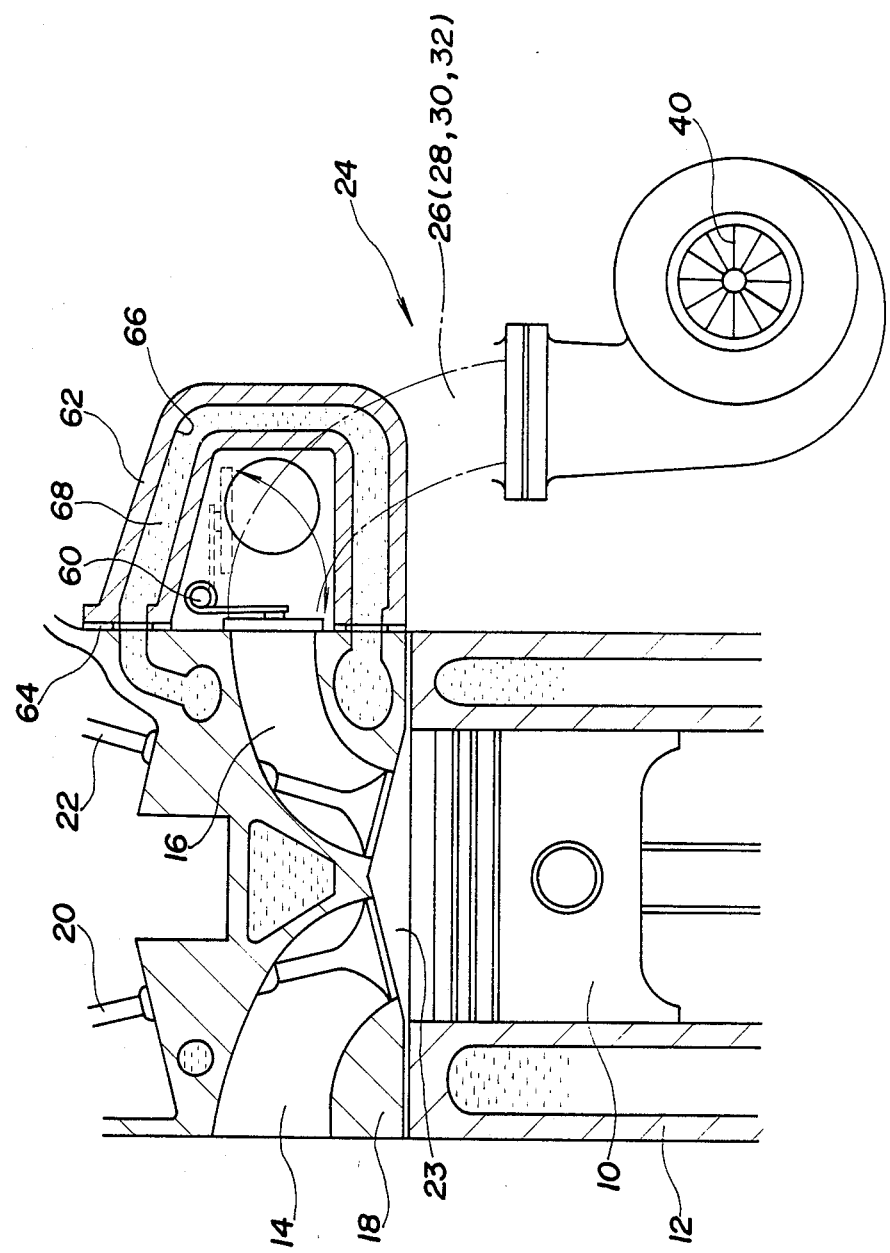
FIG. 4 is a view similar to FIG. 3 showing a fourth embodiment of the present invention.

In an embodiemnt of FIG. 4, a communicating passage 62 is secured to each cylinder head 18 through a gasket 64 and has a double wall structure to define therebetween a space 66 in which circulates a cooling water 68 used in the cylinder head 18. This can remarkably promote the lowering of temperature and pressure of the exhaust gases to be supplied to the turbine 40.

Figure 5:
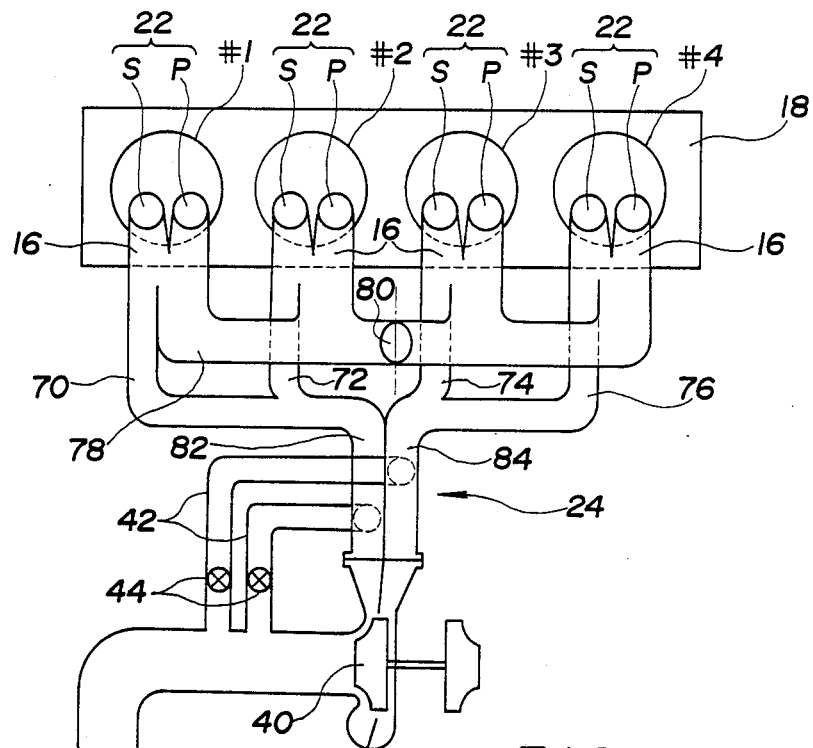
FIG. 5 is a schematic plan view of the exhaust device according to a fifth embodiment of the present invention.
Figure 6:
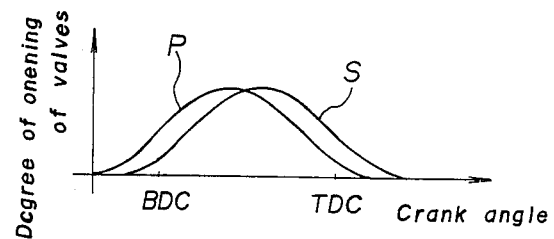
FIG. 6 is a diagram showing the relationship between degrees of opening of primary and secondary exhaust valves relative to a crank angle.

FIG. 5 shows another modification of the present invention applied to a so-called twin-scroll turbocharger in which independent passages 70 and 72 for cylinders #1 and #2 are joined together to form a first combined passage 82 and independent passages 74 and 76 for cylinders #3 and #4 are also joined together to form a second combined passage 84, and in which these two combined passages separately extend to the turbine 40. Also, each of the cylinders #1 through #4 is provided with two exhaust valves, namely primary valve P and secondary valve S. The primary valve P is located closer to a branch of a communicating passage 78 and is arranged to open earlier than the secondary valve S as shown in FIG. 6. Thus, the high-pressure, high-temperature blowdown gases effectively flow into the communicating passage 78 by fully opening the primary valves P earlier than the secondary valves S, resulting in a greater decrease in pressure and temperature of the exhaust gases.

In the above embodiemnt, each of the cylinders #1 through #4 is not individually provided with a valve, but only a single valve 80 is provided within th communicating passage 78 at a position between the two groups of the cylinders, i.e. cylinders #1 and #2 and cylinders #3 and #4, each group being connected to each combined passage so that the control mechanism is simplified without significantly impairing the response of the turbocharger.

Figure 7:
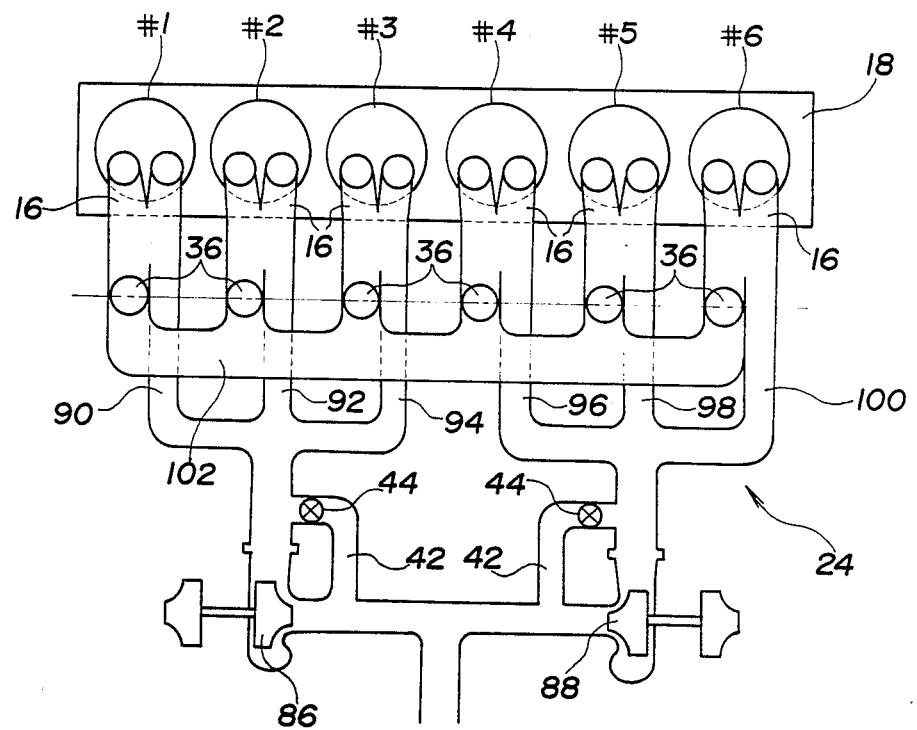
FIGS. 7 and 8 are schematic plan views of the exhaust devices according to sixth and seventh embodiments, respectively, of the present invention.

An exhaust device in FIG. 7 is illustrated as applied to a six-cylinder (#1 through #6) engine provided with two separate turbines 86 and 88, i.e. a so-called twin turbo engine, in which the turbine 86 is arranged to be driven by the exhaust gases from independent passages 90, 92 and 94 for the cylinders #1 to #3, respectively, and the other turbine 88 is driven by exhaust gases from independent passages 96, 98 and 100 for the cylinders #4 to #6, respectively. Although a communicating passage 102 is shown as having six valves 36 mounted in six branches, these valves 36 may be replaced by a single valve mounted within the communicating passage 102 at a position between the two groups of cylinders connected to the respective turbines.

Figure 8:
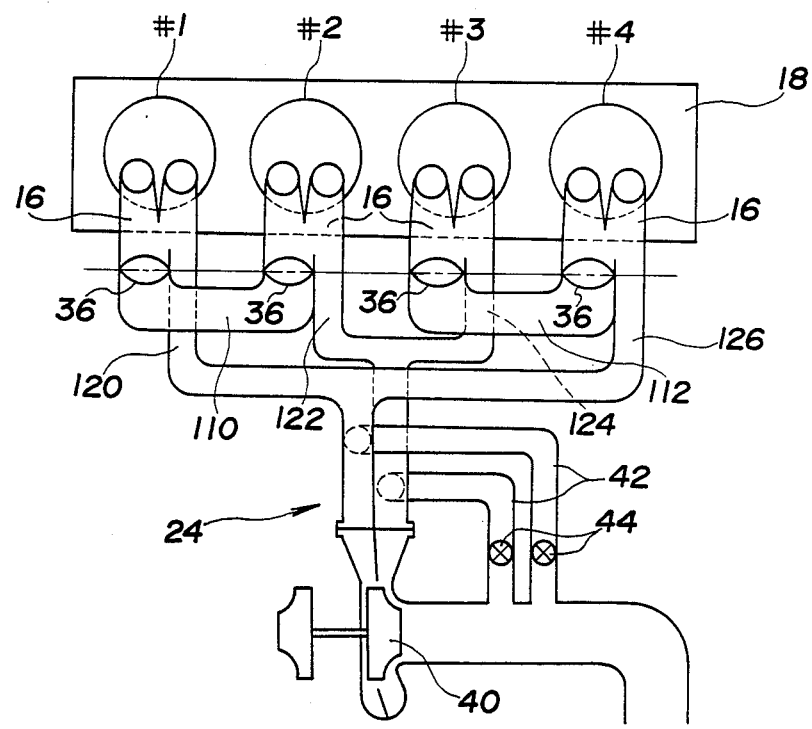

FIG. 8 shows another modification of the invention applied to the twin scroll turbocharger as in the embodiment of FIG. 5. In this embodiment, however, independent passages 120 and 126 for the respective cylinders #1 and #4 are combined together to form one scroll, while independent passages 122 and 124 for the respective cylinders #2 and #3 are also combined together to form another scroll. Two communicating passages 110 and 112 are provided, one (110) communicating the independent passages 120 and 122 with each other and the other (112) communicating the independent passages 124 and 126.

It should be understood that the devices shown in FIGS. 5, 7 and 8 can attain the advantages of the invention without spoiling the known advantages of the twin scroll turbocharger or twin turbo engine.

Figure 9A:
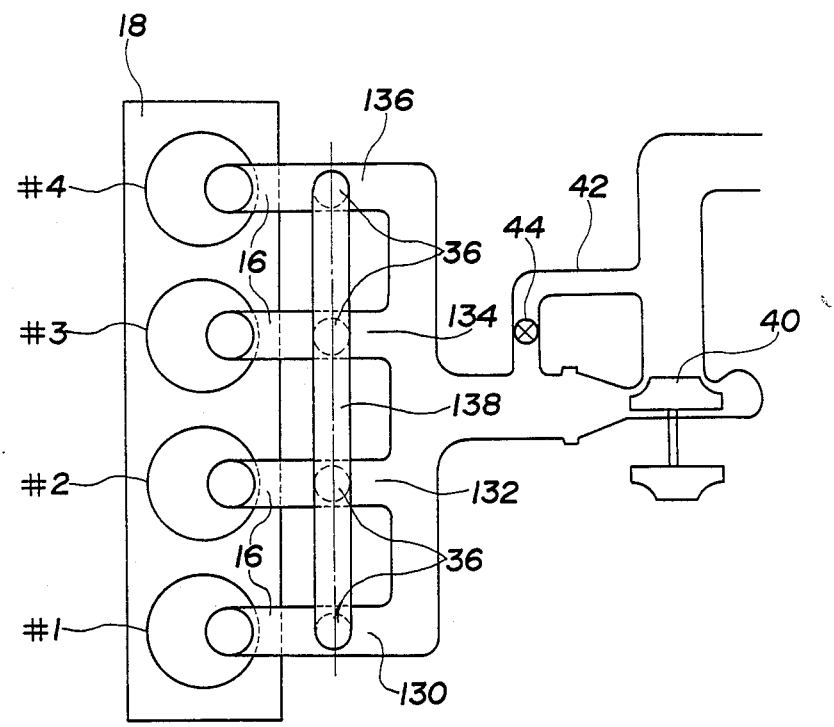
FIG. 9A is a schematic plan view of the exhaust device according to an eighth embodiment of the present invention.
Figure 9B:
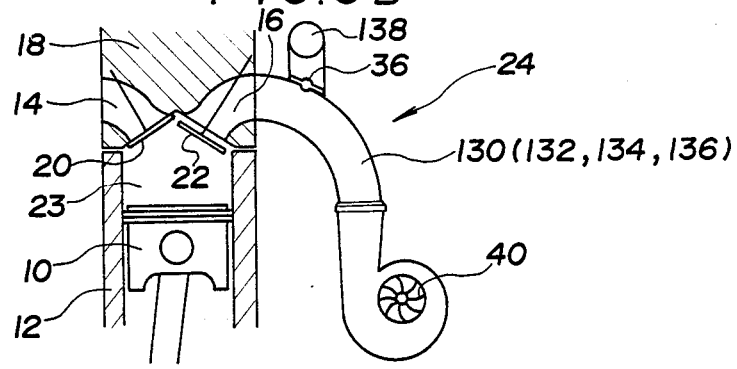
FIG. 9B is a sectional view showing a part of the device in FIG. 9A.

Although in the above embodiments each independent passage is formed to have a smaller diameter than the communicating passage, an exhaust device as shown in FIGS. 9A and 9B has independent passages 130, 132, 134 and 136 formed at substantially the same diameter as a communicating passage 138. This arrangement is also sufficient, particularly for the lowering of pressure and temperature of the exhaust gases in the high-speed, high-loaded engine conditions. Details about the relationship between the independent passage diameter and communicating passage diameter will be described hereinafter.

Figure 10:
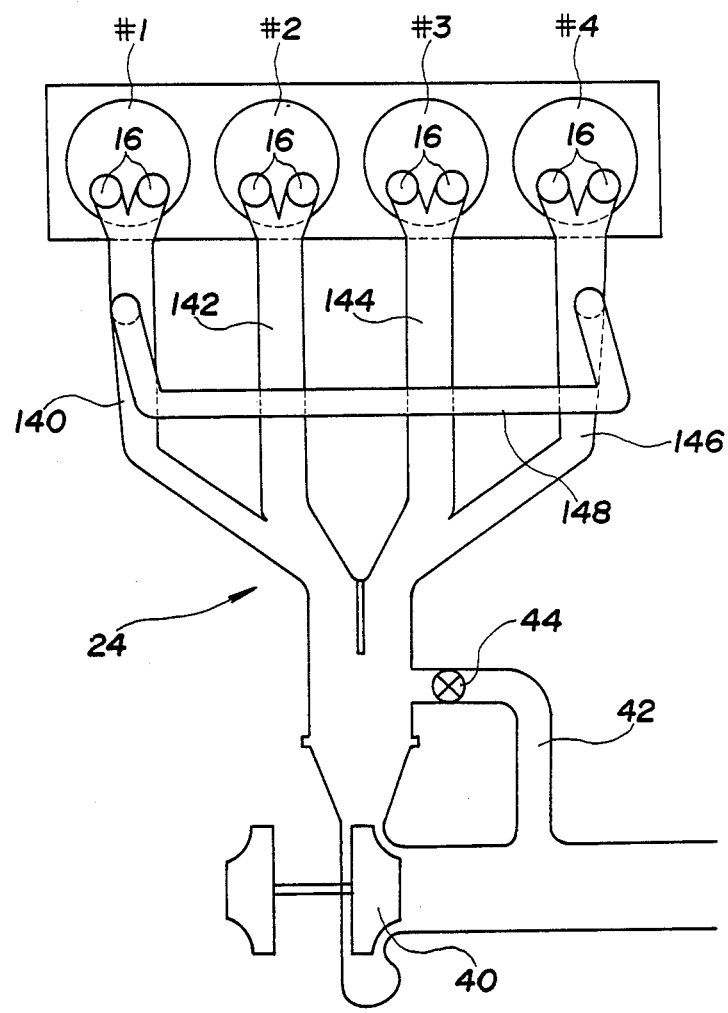
FIG. 10 is a schematic plan view of the exhaust device according to a ninth embodiment of the present invention.

FIG. 10 illustrates still another embodiment of the invention applied to a turbocharged engine having four cylinders, in which independent passages 140 and 146 for the respective cylinders #1 and #4 are formed to have a diameter smaller than a diameter of independent passages 142 and 144 for the cylinders #2 and #3 positioned between the cylinders #1 and #4. A single communicating passage 148 is provided to communicate only the two independent passages, i.e. passages 140 and 146, positioned farthest from each other. Thus, the exhaust gases from the cylinders #2 and #3, which are situated closer to the turbine 40 than are the cylinders #1 and #4 are, quickly supplied to the turbine 40 through their respective passages 142 and 144 so that a charging response may be maintained at a sufficient level. The independent passages 140 and 146 for the cylinders #1 and #4 are formed small in diameter in order to prevent expansion of the exhaust gases during the relatively long travel to the turbine 40, but the communicating passage 148 having a large length can radiate the heat to thereby lower the gas temperature. Depending on the diameters of the independent passages 140 and 146 and of the communicating passage 148, valves such as 36 in the above embodiments may be omitted, which can further simplify the structure.

It is to be noted that in any of the above embodiments provision of the valve for closing the communicating passage is not essential, particularly for the purpose of improving fuel consumption in the high-speed, high-loaded engine conditions.

The invention may also be applicable to an engine with no turbocharger, i.e. to a naturally aspirated engine, and several examples thereof will be described below.

Figure 12:
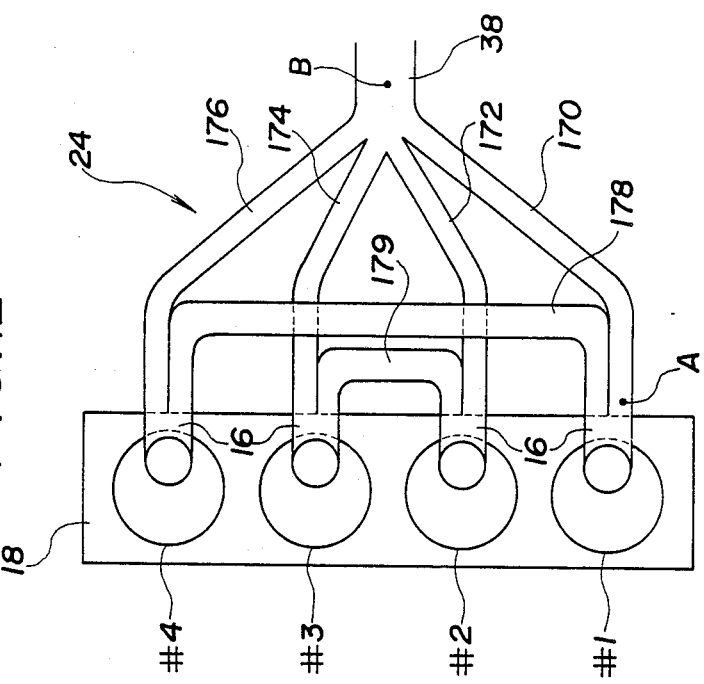
FIGS. 11 and 12 are schematic plan views of the exhaust device according to tenth and eleventh embodiments, respectively, of the present invention.
Figure 11:
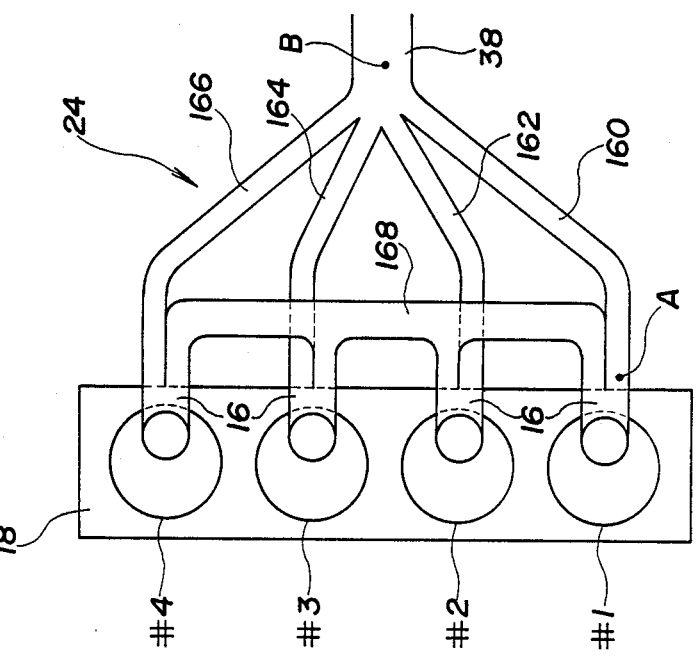

FIG. 11 shows one example of the present device applied to a naturally aspirated engine in which independent passages 160, 162, 164 and 166 are communicated with each other through a communicating passage 168. Also, FIG. 12 shows another example of the device applied to a naturally aspirated engine in which independent passages 170 and 176 for cylinders #1 and #4, of which exhaust strokes are not continuous, are communicated by a passage 178, and the remaining independent passages 172 and 174 for cylinders #2 and #3, of which exhaust strokes also are not continuous, are communicated by another passage 179, as in the embodiment of FIG. 2.

These exhaust devices make it possible to lower the gas temperature due to provision of the communicating passages. The applicants herein conducted tests in order to determine the relationship between the gas temperature and fuel consumption, with using the devices of FIGS. 11 and 12 and, for comparative purposes, a conventional exhaust device as shown in FIG. 14. The test results are indicated in diagrams of FIGS. 13A and B, in which gas temperatures marked with X are values measured in the conventional device, with white circles representing the device of FIG. 11 and with black circles representing the device of FIG. 12, and in which lines A show variations of gas temperature measured at Point A near the exhaust port in the devices while lines B show variations measured at Point B in the downstream portion 38 where the independent passages are all joined together. The passage wall made of material which is typically employed for an exhaust manifold has a heat resistance up to about 850° C.

Figure 13A:
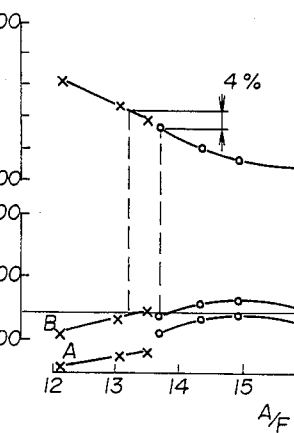
FIGS. 13 A and B are diagrams showing relationships of temperature of exhaust gases and fuel consumption relative to air-fuel ratio.
Figure 14:
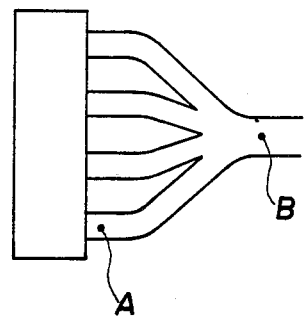
FIG. 14 is a schematic plan view showing a conventional exhaust device used in tests.

As clearly seen from FIG. 13A, in the conventional exhaust device the temperature (marked with X) at Point B reached the limit of 850° C. when the air-fuel ratio exceeded about 13, and therefore the air-fuel mixture could not be made still leaner. In this connection, it should be noted that the temperatures (average temperatures) at Point B were higher than the temperatures at Point A because the exhaust gases continuously flowed in the combined portion 38. On the other hand, temperatures (marked with white circles) in the device of FIG. 11 did not reach the limit of 850° C. until the air-fuel ratio approached 14, which makes it possible to improve the fuel consumption by about 4% compared with the conventional device. In the FIG. 11 device the temperatures at Point A were higher than those at Point B because the communicating passage 168 continuously supplied the exhaust gases from the other cylinders to Point A which was near the exhaust port 16.

Figure 13B:
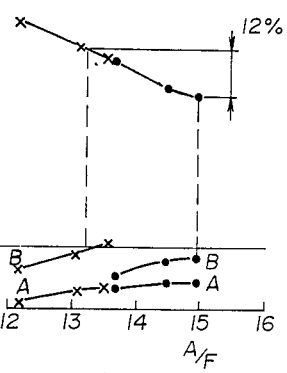

Meanwhile, the temperatures (marked with black circles) in the FIG. 12 device were found to be below the limit at both Points A and B even when the air-fuel ratio was approximately 15, i.e the theoretical ratio. Accordingly, by setting a critical air-fuel ratio to be approximately 15, the fuel consumption can be improved by about 12% compared with the conventional device, as indicated in FIG. 13B. Thus, the FIG. 12 device was able to lower the exhaust gas temperature relative to the air-fuel ratio by an amount greater than the FIG. 11 device. This is because of the smaller amount of gasses flowing into Point A in the FIG. 12 device in which one communicating passage connects two of the four independnent passages with each other. For the same reason, the temperatures were higher at Point B than at Point A.

Figure 15:
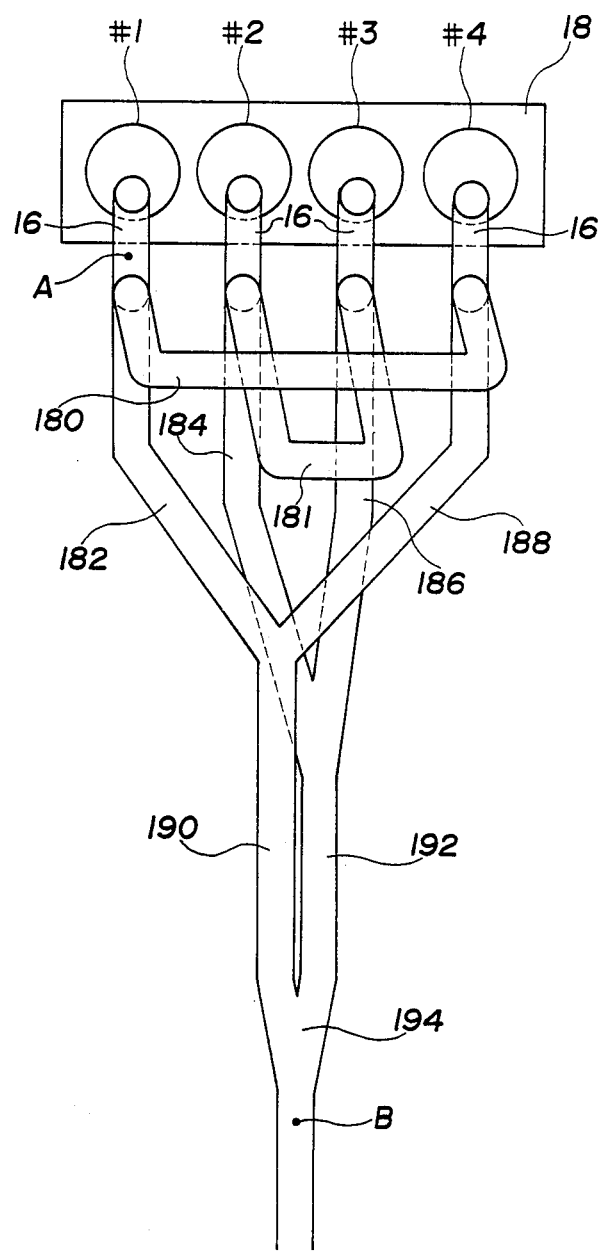

FIG. 15 shows still another modification of the present invention applied to a naturally aspirated engine which, as in the FIG. 12 device, has two communicating passages 180 and 181, the passage 180 communicating two independent passages 182 and 188 for the cylinders #1 and #4 of which the exhaust strokes are not continuous, and the passage 181 communicating the other two independent passages 184 and 186 for the cylinders #2 and #3 of which the exhaust strokes similarly are not continuous. In order to constitute a so-called dual exhaust manifold, the pairs of the independent passages 182 and 188, and 184 and 186 are first combined to form intermediate portions 190 and 192, respectively, which are finally joined together at 194. In this embodiment the total length of the exhaust passages up to the single portion 194 can be increased by elongating only the two intermediate portions 190 and 192, to thus lower the gas temperature in the portion 194. This is advantageous in size and weight of the exhaust device, when compared with elongating each independent passage. Adjusting the length of the intermediate portions 190 and 192 makes it possible to substantially equalize the temperature at Point A with the temperature at Point B, thereby permitting the air-fuel ratio to be set as lean as possible for further improving the fuel consumption.

It will be understood that when the present device is applied to the naturally aspirated engine as illustrated in FIGS. 11, 12 and 15, valves need not be provided in the communicating passage for closing the same. In connection with the naturally aspirated engine, it is particularly preferable to provide the communicating passages in such a manner that each passage communicates the independent passages for those cylinders the exhaust strokes of which substantially do not overlap, so that interaction of the exhaust gases may be prevented.

An exhaust device shown in FIG. 16 is similar to the above device but is different therefrom in that the adjacent independent passages 184 and 186 for the cylinders #2 and #3 are not communicated with each other. Thus, only a single communicating passage 200 is provided to connect the independent passage 182 with 188, these passages 182 and 188 being situated farthest from each other. While simplifying the structure, this device may still lower the exhaust gas temperature effectively by the communicating passage 200 which necessarily has a large length through which the heat is radiated.

Figure 18A:
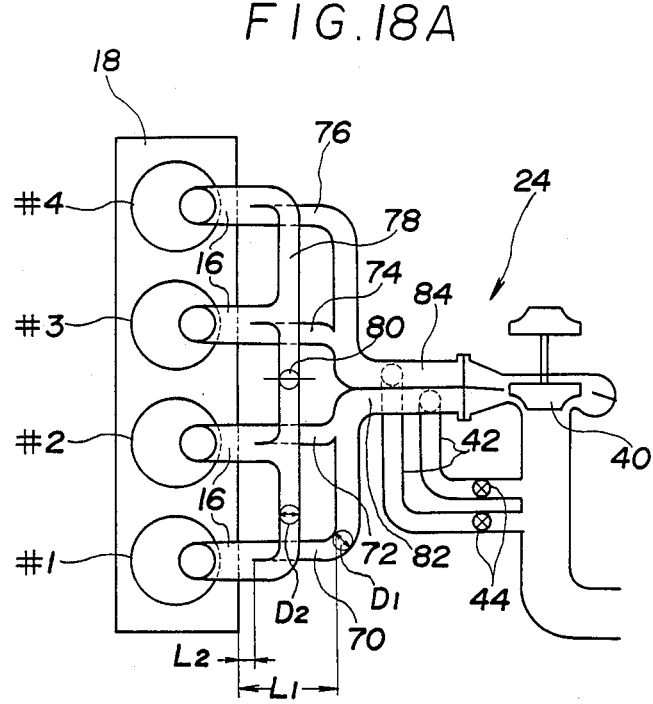
FIGS. 18 A and B are explanatory plan views of the devices used for measurement of the characteristics shown in FIG. 17.
Figure 18B:
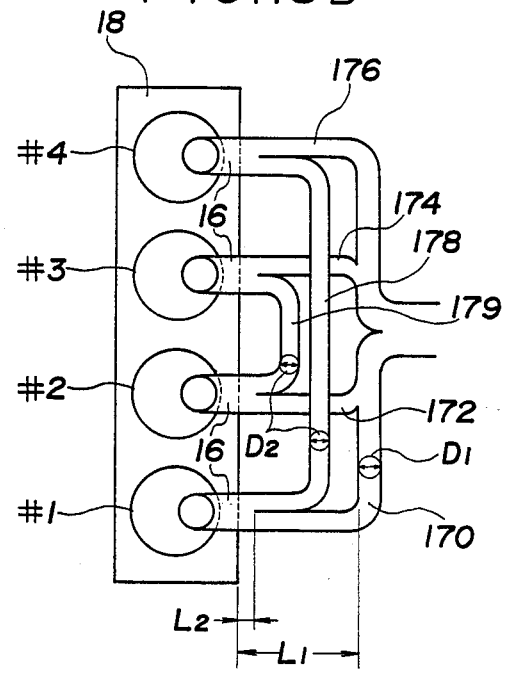

In order to see how the fuel consumption varies according to a dimensional change of the communicating passage, the applicants prepared two sample devices as shown in FIGS. 18A and 18B. The exhaust device of FIG. 18A is substantially the same as that of FIG. 5 and was applied to a turbocharged engine (1.6 liter with four cylinders) having one exhaust valve for each cylinder, and the exhaust device of FIG. 18B had substantially the same structure as that of FIG. 12 and was applied to a naturally aspirated engine (2.0 liter with four cylinders). In each device, the diameter of the independent passage is indicated as $D_1$ while the diameter of the communicating passage is indicated as $D_2$. The exhaust manifold in FIG. 18A had a capacity of 300 cm$^3$ (except the communicating passage 78) with each independent passage of 25 mm equivalent diameter ($D_1$), and the manifold in FIG. 18B had a capacity of 500 cm$^3$ (except the communicating passages 178 and 179) with each independent passage of 28 mm equivalent diameter ($D_1$). Tests were conducted to measure the fuel consumption while changing the equivalent diameter $D_2$ of the communicating passage, and the test results are illustrated in FIGS. 17A and 17B.

As is apparent from FIG. 17A, in the turbocharged engine the fuel consumption ratio began to decrease remarkably when $D_2$ was set to about one half of $D_1$, and became substantially constant after $D_2$ approximated $D_1$ Accordingly, in the case of turbocharged engines it is preferable that the communicating passage has a diameter $D_2$ over one half ($\frac{1}{2}$) of the diameter $D_1$ of the independent passage and, more preferably, the diameter $D_2$ should approximate or even exceed the diameter $D_1$ On the other hand, in the naturally aspirated engine remarkable improvement in the fuel consumption ratio began to be observed when $D_2$ was about one quarter of $D_1$, and became substantially constant after $D_2$ approximated one half of $D_1$ as seen from FIG. 17B. Accordingly, in the case of naturally aspirated engines the communicating passage should preferably have a diameter $D_2$ over one quarter ($\frac{1}{4}$) of the diameter $D_1$ of the independent passage and, more preferably, the diameter $D_2$ should be more than one half ($\frac{1}{2}$) of the diameter $D_1$.

The communicating passage is branched off the independent passage preferably in such a manner that the exhaust gases, when flowing into the independent passage from the branch, flow in the upstream direction, i.e. toward the exhaust port. As discussed above, it is necessary to provide the opening through which the communicating passage is connected to the independent passages, at positions upstream of a first junction where all or some of the independent passages are first joined together. It is preferable in this connection that a distance between the exhaust port 16 and the opening of a communicating passage (indicated as $L_2$ in FIGS. 18A and 18B), is less than one half ($\frac{1}{2}$) of a distance between the exhaust port and the first junction ($L_1$) so that the gases may flow into the communicating passage immediately after being discharged from the exhaust port.

What is claimed is:

1. An exhaust device for an internal combustion engine having a plurality of cylinders with respective exhaust ports, said exhaust device comprising:
a plurality of independent passages having upstream ends for connection to respective exhaust ports of respective of the cylinders and downstream ends joined together at at least one junction; and
communicating passage means for connecting at least some of said independent passages at positions upstream of said junction, said communicating passage means including a long passage connecting at least those of said independent passages the respective cylinders of the engine of which are spaced the furthest from each other and have exhaust strokes that substantially do not overlap with each other.

2. A device as claimed in claim 1, wherein said communicating passage means comprises plural passages, said long passage comprising one of said plural passages, and each of said plural passages connects a group of said independent passages the respective cylinders of the engine of which have exhaust strokes that substantially do not overlap with each other.

3. A device as claimed in claim 1, wherein the distance between the connection of said long passage to each said independent passage and said first end of said independent passage is less than 50% of the distance between said first and second ends of said independent passage.

4. A device as claimed in claim 1, for use in a naturally aspirated engine, wherein said long passage has an equivalent diameter of more than 25% of an equivalent diameter of each said independent passage.

5. A device as claimed in claim 1, wherein said long passage is formed in a double wall member defining a space for circulating cooling water from a cylinder head of the engine.

6. A device as claimed in claim 1, wherein each cylinder of the engine includes plural exhaust valves, and said long passage is to be positioned closer to an earliest opening of the plural exhaust valves.

7. A device as claimed in claim 1, wherein said long passage permits the flow therethrough of exhaust gases from said those independent passages without interaction with exhaust gases from other of said independent passages.

8. A device as claimed in claim 1, wherein said long passage has a substantially uniform dimension throughout the entire length thereof and includes branches bifurcating from the least said those independent passages.

9. A device as claimed in claim 1, for use in a four-cylinder engine, wherein said long passage connects said independent passages for the first and fourth cylinders of the engine, and said communicating passage means further comprises a short passage connecting said independent passages of the second and third cylinders of the engine.

10. A device as claimed in 1, wherein said communicating passage means connects only said those independent passages without connection to other of said independent passages.

11. An exhaust device for use in an internal combustion engine having a plurality of cylinders with respective exhaust ports and having an exhaust turbo-supercharger, said exhaust device comprising:
a plurality of independent passages having upstream ends for connection to respective exhaust ports of respective of the cylinders and downstream ends joined together at at least one junction; and
communicating passage means for connecting at least some of said independent passages at positions upstream of said junction, said communicating passage means including a long passage connecting at least those of said independent passages the respective cylinders of the engine of which are spaced the furthest from each other and have exhaust strokes that substantially do not overlap with each other.

12. A device as claimed in claim 11, wherein said independent passages are combined at said junction to form two extensions for separately leading exhaust gases to a turbine of the turbo-supercharger.

13. A device as claimed in claim 11, wherein at least one of said independent passages for a cylinder located close to the turbo-charger is not connected to said communicating passage means.

14. A device as claimed in claim 13, wherein said independent passages connected to said communicating passage means have a diameter smaller than the diameter of said at least one independent passage.

15. A device as claimed in claim 11, wherein the exhaust turbosupercharger includes two separately arranged turbines, and said independent passages are arranged in two groups for leading exhaust gases to respective of the turbines.

16. A device as claimed in claim 11, wherein said communicating passage means includes valve means for controlling the communication between said independent passages, said valve means being opened for achieving communication in high-speed and high loaded engine conditions.

17. A device as claimed in claim 16, wherein said valve means comprises a plurality of valves each mounted at a position where a respective said independent passage is connected to said communicating passage means.

18. A device as claimed in claim 16, wherein said valve means comprises a single valve mounted in the middle of said communicating passage means.

19. A device as claimed in claim 16, wherein said valve means comprises a rotary valve.

20. A device as claimed in claim 16, wherein said valve means comprises a swing valve pivoted at one end thereof.

21. A device as claimed in claim 11, wherein said communicating passage means has an equivalent diameter of more than 50% of an equivalent diameter of said independent passages.

22. A device as claimed in claim 11, wherein said communicating passage means comprises plural passages, said long passage comprising one of said plural passages, and each of said plural passages connects a group of said independent passages the respective cylinders of the engine of which have exhaust strokes that substantially do not overlap with each other.

23. A device as claimed in claim 11, wherein the distance between the connection of said long passage to each said independent passage and said first end of said independent passage is less than 50% of the distance between said first and second ends of said independent passage.

24. A device as claimed in claim 11, wherein said long passage is formed in a double wall member defining a space for circulating cooling water from a cylinder head of the engine.

25. A device as claimed in claim 11, wherein each cylinder of the engine includes plural exhaust valves, and said long passage is to be positioned closer to an earliest opening of the plural exhaust valves.

26. A device as claimed in claim 11, wherein said long passage permits the flow therethrough of exhaust gases from said those independent passages without interaction with exhaust gases from other of said independent passages.

27. A device as claimed in claim 11, wherein said long passage has a substantially uniform dimension throughout the entire length thereof and includes branches bifurcating from at least said those independent passages.

28. A device as claimed in claim 11, for use in a four-cylinder engine, wherein said long passage connects said independent passages for the first and fourth cylinders of the engine, and said communicating passage means further comprises a short passage connecting said independent passages of the second and third cylinders of the engine.

29. A device as claimed in claim 11, wherein said communicating passage means connects only said those independent passages without connection to other of said independent passages.

* * * * *